(12) United States Patent
Vasiloiu (10) Patent No.: US 7,797,981 B2
(45) Date of Patent: Sep. 21, 2010

(54) POSITION MEASURING DEVICE (75) Inventor: Victor Vasiloiu, Braunau am Inn (AT)

(73) Assignee: AMO Automatisierung Messtechnik Optik GmbH, St. Peter am Hart (AT)

( * ) Notice: Subject to any disclaimer, the term of this patent is extended or adjusted under 35 U.S.C. 154(b) by 514 days.

(21) Appl. No.: 11/985,867

(22) Filed: Nov. 16, 2007

(65) Prior Publication Data

US 2008/0148808 A1 Jun. 26, 2008

(30) Foreign Application Priority Data

Nov. 17, 2006 (EP) .................................. 06450170

(51) Int. Cl.
*G01B 3/00* (2006.01)
(52) U.S. Cl. ...................................................... 73/1.79
(58) Field of Classification Search ........................ None
See application file for complete search history.

(56) References Cited

U.S. PATENT DOCUMENTS 4,539,835 A * 9/1985 Shambroom et al. ......... 73/1.81

6,433,333 B1 * 8/2002 Howard .................... 250/252.1
2005/0274878 A1 * 12/2005 Goldman et al. ......... 250/231.13

FOREIGN PATENT DOCUMENTS

| DE | 1 811 961 | 6/1970 |
|---|---|---|
| DE | 199 20 596 | 11/2000 |
| EP | 0 302 194 | 2/1989 |

* cited by examiner

*Primary Examiner*—Robert R Raevis
(74) *Attorney, Agent, or Firm*—Lucas & Mercanti, LLP; Klaus P. Stoffel (57) ABSTRACT

A position-measuring device for detecting the relative position of two bodies capable of motion relative to each other includes a measurement standard with a scale division connected to one of the bodies and a scanning head (MK) connected to the other body for reading the scale division, wherein the scanning head is connected to an electronic evaluation unit. The electronic evaluation unit has a nonvolatile memory in which correction values for the measurement values recorded by the scanning head are stored, wherein the correction values are determined during a preceding calibration of the position-measuring device together with the use of at least one other scanning head to scan the same measurement standard.

3 Claims, 6 Drawing Sheets

POSITION MEASURING DEVICE

BACKGROUND OF THE INVENTION

1. Field of the Invention

The present invention relates to a position-measuring device for detecting the relative position of two bodies capable of motion relative to each other, the device comprising a measurement standard with a scale division connected to one of the bodies and a scanning head connected to the other body for reading the scale division, wherein the scanning head is connected to an electronic evaluation unit.

2. Description of the Related Art

Measuring devices with multiple scanning for accurate detection of angles are known in the prior art. An angle-measuring device of this type consists basically of a measurement standard in the form of a disk-shaped carrier with a measurement scale division and one or more scanning units. When the two elements move relative to each other, the scanning unit detects the angular position of the measurement standard in absolute or incremental form. It is extremely important that such devices measure the angle with extremely high accuracy. This accuracy is influenced essentially by the following system properties:

- the eccentricity of the overall measurement scale division with respect to the rotational axis;
- the deviations of the shape of the scale division carrier from the ideal cylindrical shape;
- division errors in the form of local geometric deviations from the ideal form of the coding in the rotational direction or perpendicular to it;
- the runout of the bearings;
- aleatoric geometric deviations such as bearing play or material deformation under load; and
- deviations in the detection of the angular position caused by the electronic evaluation unit.

It is a general principle of the scanning of periodic scale divisions that it is not sufficient to use a single scanning head with a sensor unit to scan a single period (division mark) of the scale division. Instead, several such periods are detected simultaneously not only to generate the desired signals but also to allow the signals to be averaged, so that the individual division mark errors can be suppressed. This means that, by electronically calculating the average value of the signals generated by the individual division marks, a more accurate set of angle data can be obtained for the scanned range of the scale division. This principle extrapolates; that is, a complete circular measurement around the entire circumference of the measurement standard should yield ideal results. As will be explained below, this type of scanning also suppresses all of the other sources of error mentioned above. This system design can seldom be technically realized in a practical manner, and for this reason various substitute solutions have been developed over the course of time.

Most of these solutions are based on double diametric scanning, which completely suppresses the errors caused by the eccentricity of the scale division and reduces the remainder of the other deviations to a mean value. An exact explanation of this principle can be found in the following description.

An important aspect of the summation of the individual signals from the two scanning units is that they must be in phase with only a small allowable deviation (phase difference approaching "0") to prevent any reduction in the amplitude. Otherwise, in the extreme case, i.e., in the case of a phase difference of 180° (counterphase), the overall signal would be reduced to a sum of "zero".

DE 1 811 961 discloses an angle-measuring device with diametrically opposed scanning units. Four scanning units are used for error compensation. To solve the phase difference problem, a second, round reference scale division with its own diametrically opposing scanning units is used in addition to the primary measuring scale division of the measurement standard. This solution is highly complex and is expensive to implement.

EP 0 302 194 B1 describes a circuit for monitoring the phase difference between individual scanning units of an angle-measuring device with diametrically opposed detection sensors and for suppressing the possible error which can occur when the phase difference between the individual scanning units is exceeded. This prevents an irreversible loss of the angle values, and the division periods which have already been completely scanned are preserved.

DE 19 920 596 C2 describes a special complex electronic circuit for converting all the individual analog input signals from the various diametrically opposing scanning units of an angle-measuring device into digital values. It also describes how these signals are compensated to obtain the measurement data.

SUMMARY OF THE INVENTION

The object of the present invention is to provide a position-measuring device for detecting angles or linear distances, for example, with compensation for the systematic measurement error and with an accuracy similar to that of a multi-head scanning system, where at the same time the complexity of implementation can be significantly reduced with respect to both hardware and software, and where the problems associated with the phase differences between the individual scanning units which occur in the prior art exert no detrimental effect.

This object is met in a position-measuring device of the type described above in that the electronic evaluation unit has a nonvolatile memory, in which correction values for the measurement values recorded by the scanning head are stored, wherein the correction values are determined during a preceding calibration of the position-measuring device with the use of at least one additional scanning head.

It is therefore possible to detect relative positions with a high level of accuracy during operation. Only a single scanning head is required for this purpose, which means not only that there is no longer any need for additional scanning heads but also that the computing power required during operation is significantly reduced. A position-measuring device of this type can be designed to measure both angles and distances. The additional scanning head, also called the "calibration head", is mounted on the same body as that to which the scanning head, also called the "measurement head", is connected. The relative position of the scanning heads therefore remains the same during the calibration procedure. The additional scanning head scans the same measurement standard as the measurement head but at a different position.

The above task is also accomplished by a method for detecting the relative position of two bodies capable of motion relative to each other in which a measurement standard connected to one of the bodies is scanned by a scanning head connected to the other body and which is characterized in that the measurement values recorded by the scanning head are corrected by stored correction values which have been determined during a preceding calibration procedure with the use of at least one additional scanning head.

The correction values are always available after the calibration. Because the errors and deviations of measuring systems of this type are essentially reproducible, the previously determined correction values and their application to the measurement values represent a reliable procedure for guaranteeing the accuracy of the corrected measurement values.

The object of the invention is also met by a method for calibrating a position-measuring device for detecting the relative position of two bodies capable of motion relative to each other, where the position-measuring device comprises a measurement standard with a scale division connected to one of the bodies and a scanning head connected to the other body to scan the scale division, the scanning head being connected to an electronic evaluation unit (AE); where at least one additional scanning head is added to the position-measuring device to scan the same measurement standard; where measurement values are determined by the scanning heads (MK, CK); where correction values are determined from the deviations between the measurement values recorded by the individual scanning heads (MK, CK); where these correction values are stored in a nonvolatile memory of the electronic evaluation unit (AE); and where the additional scanning head (CK) is then removed from the position-measuring device.

The invention is based on the realization that, for highly accurate angle-measuring applications, it is also necessary to have highly accurate, play-free, and very stiff pretensioned bearings. As a result, the possible measurement deviations have predominantly a systematic, reproducible course, whereas the aleatoric influences remain negligible. Also in the case of linear position measurements, in which not an angle but rather a distance is of interest, it can be assumed that the errors will be systematic and reproducible. The invention is described first on the basis of a measuring device for angles, but at the end a possible realization for linear measuring systems will also be presented.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
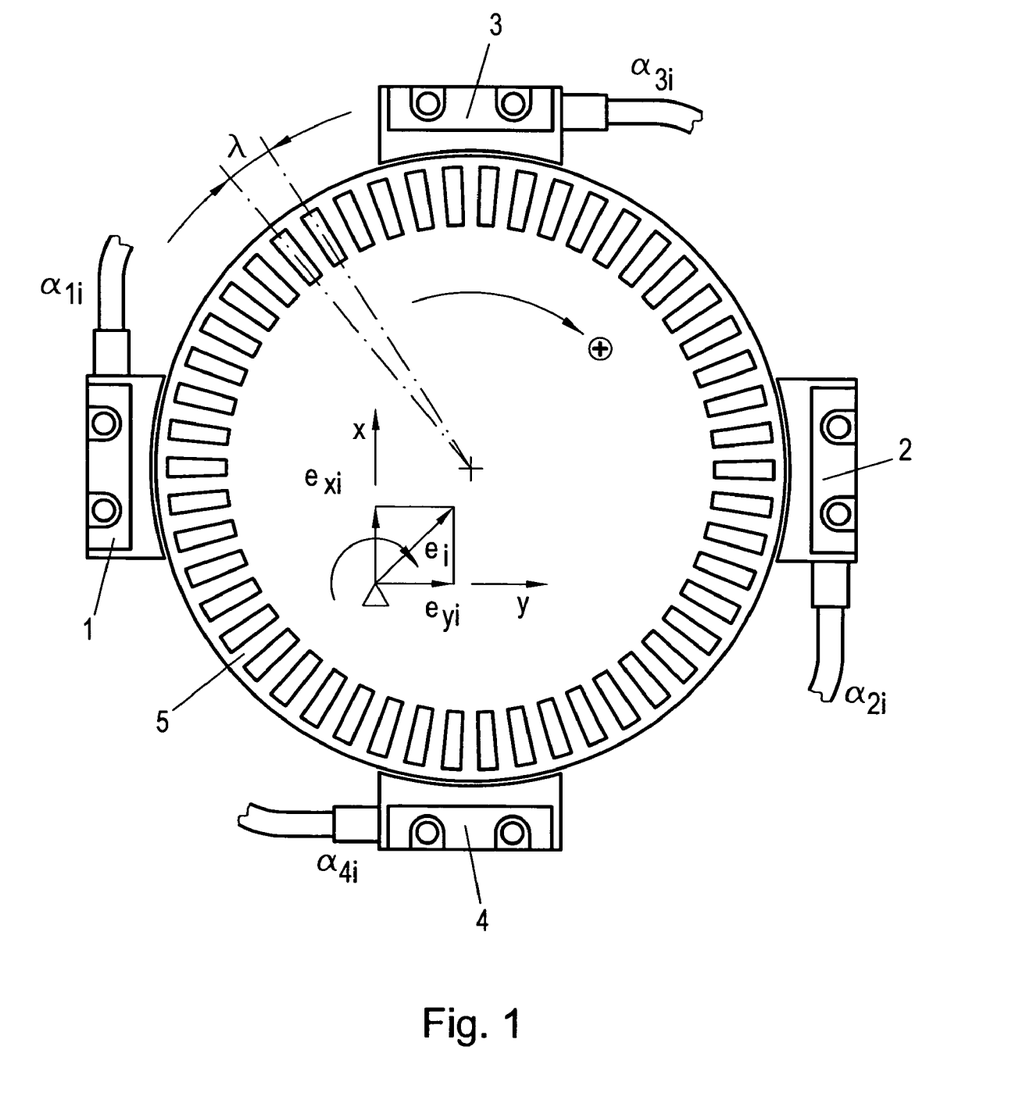
FIG. 1 shows a position-measuring device according to the prior art with four scanning heads which are attached at all times.

FIG. 1 shows a measuring disk 5 provided with a measurement standard with periodic scale divisions. The measuring disk rotates with an eccentricity "e" past four diametrically placed scanning heads 1, 2, 3, 4. The scale division can involve areas of different electrical, optical, or magnetic properties, etc.

The scanning heads can basically detect only relative movement of the scale division in the tangential direction and are insensitive to movements perpendicular to that direction. Thus, for example, scanning heads 1 and 2 (FIG. 1) detect movements with opposite signs in the X direction and are insensitive to position changes of the measuring disk in the Y direction. It is assumed that the angle data are impaired not only by the eccentricity "e" but also by other systematic deviations such as the runout of the axis, by local scale division errors, by shape deviations, etc. Under these conditions, the way in which the signals are formed for a certain angle can be expressed as follows:

$$\alpha_{1i} = \alpha_i + \epsilon_{1i} + e_{xi}$$

$$\alpha_{2i} = \alpha_i + \epsilon_{2i} - e_{xi}$$

$$\alpha_{3i} = \alpha_i + \epsilon_{3i} + e_{yi}$$

$$\alpha_{4i} = \alpha_i + \epsilon_{4i} - e_{yi}$$

where $\alpha_i$ stands for the actual angles or angle changes, that is, the ideal value; $\alpha_{1i}$, $\alpha_{2i}$, $\alpha_{3i}$, and $\alpha_{4i}$ stand for the measurement values recorded by the individual scanning heads 1, 2, 3, 4; "e" stands for the errors caused by the eccentricity; and $\epsilon_{1i}$, $\epsilon_{2i}$, $\epsilon_{3i}$, $\epsilon_{4i}$ stand for the sum of the systematic or local deviations.

To form the mean value of the measurement signals from a pair of diametrically opposed scanning heads, we have:

$$\alpha_{io} = (\alpha_{1i} + \alpha_{2i})/2 = \alpha_i + (\epsilon_{1i} + \epsilon_{2i})/2$$

This means that the eccentricity error $e_{xi}$ is eliminated and that the remaining individual systematic errors are reduced through the formation of their mean value. In a similar way, we express the formation of the mean value of the signals obtained from two pairs of diametrically arranged scanning heads as follows:

$$\alpha_{io} = (\alpha_{1i} + \alpha_{2i} + \alpha_{3i} + \alpha_{4i})/4 = \alpha_i + (\epsilon_{1i} + \epsilon_{2i} + \epsilon_{3i} + \epsilon_{4i})/4$$

This means a further reduction in the systematic errors contained in the angle output value.

These errors with a strictly systematic behavior, which is repeatable on each revolution of the scale division, can be detected during an introductory procedure after the installation of the inventive angle-measuring device and stored. During operation, therefore, the device can apply a correction value corresponding to these errors to each measured angle and thus eliminate or minimize the deviations.

In a measuring arrangement such as that shown in FIG. 2a, in which the following designations are used:
M=measurement head,
CK=calibration head,
AE=electronic evaluation unit, and
TS=measurement standard in the form of a disk with scale division marks, the measurement values for an entire revolution of the measurement standard of the measurement and calibration heads—as will be explained in the following—can be used in a calibration procedure to be carried out after the installation of the measurement system, so that correction values can be stored in a "look-up table" or calibration table in the electronic evaluation unit for the entire range of angles.

This correction contains all the systematic measurement deviations such as the eccentricity resulting from installation errors and the other local scale division errors.

During the calibration procedure, an additional scanning head is set up next to the measurement standard. After the correction factors have been calculated from the measurement values of the scanning heads and stored in nonvolatile memory, the additional scanning head, also referred to below as the "calibration head", is removed. During normal operation, therefore, the calibration head CK is no longer present, as can be seen in FIG. 2c, and the measuring system works only with the measurement head MK, but nevertheless still delivers corrected measurement values. This is done by applying the correction values obtained in the preceding calibration procedure to the measurement values of the measurement head MK.

To achieve a further increase in accuracy, the calibration head can, during the calibration procedure, be attached sequentially to two additional locations 90° away from the first measurement axis in order to simulate a 4-head scanning procedure (FIG. 2b). In this way, the deviations are detected in all 4 positions and used to calculate the correction values stored in the electronic evaluation unit AE.

When this arrangement is used, again only the measurement head MK alone is working during operation of the device. An advantage of a measuring device of this type is also to be seen in the fact that, in cases where a series of position-measuring devices are in service, all of them can be calibrated with a single calibration head.

This measurement and calibration method, which is characterized according to the invention by the features in the following claims, can be used in conjunction with any of the physical principles on the basis of which an angle or distance measuring device can function. Thus, the device can detect the values in question by opto-electronic, magnetic, inductive, capacitive, or any other suitable means.

A preferred, reliable, and simple implementation of this measuring arrangement is described in the following, but of course it does not represent the only possible one.

Figure 2:
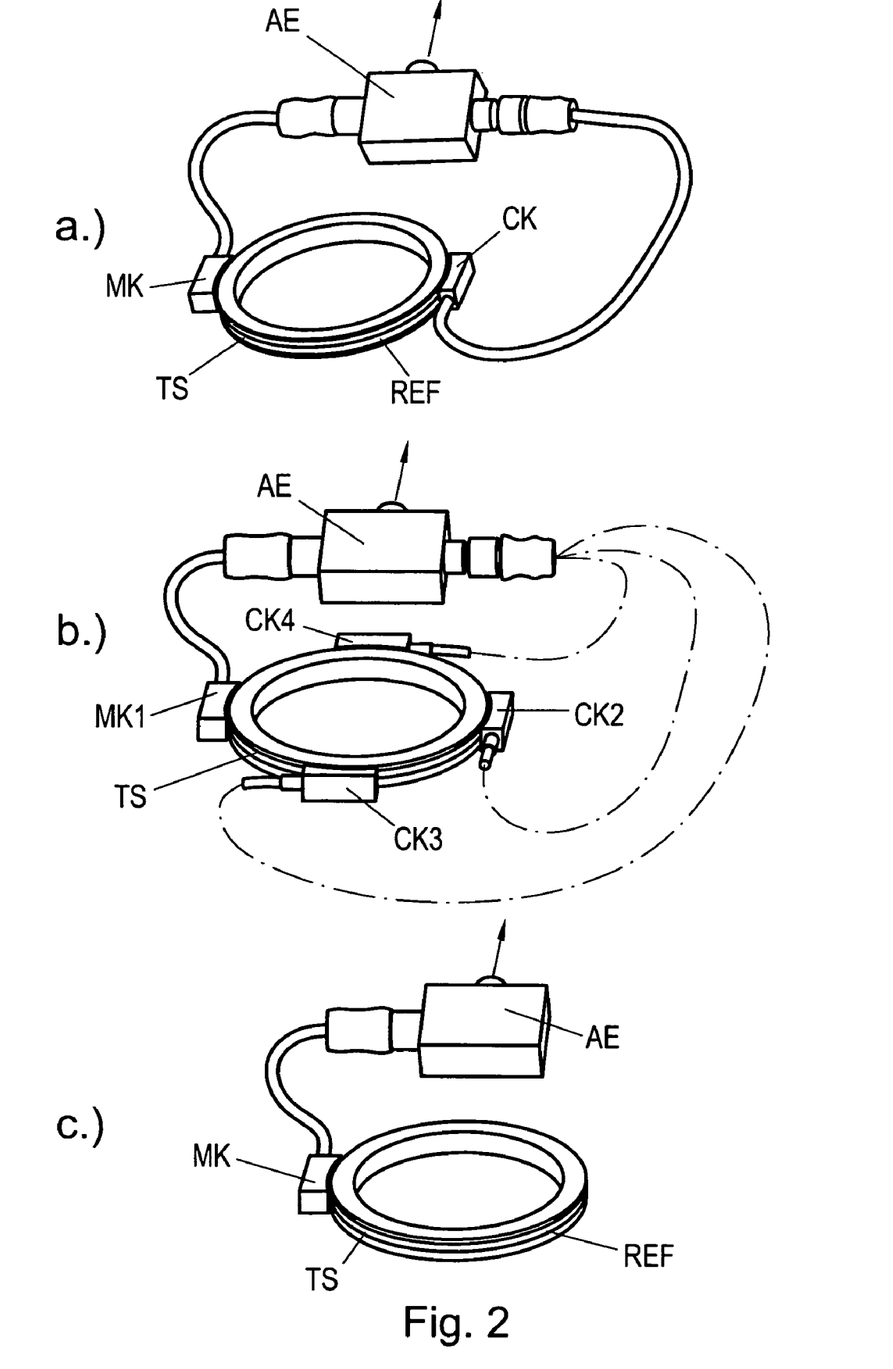
FIG. 2a and FIG. 2b show the configuration of an inventive position-measuring device during the calibration procedure.
FIG. 2c shows an inventive position-measuring device after the calibration procedure.
Figure 3A:
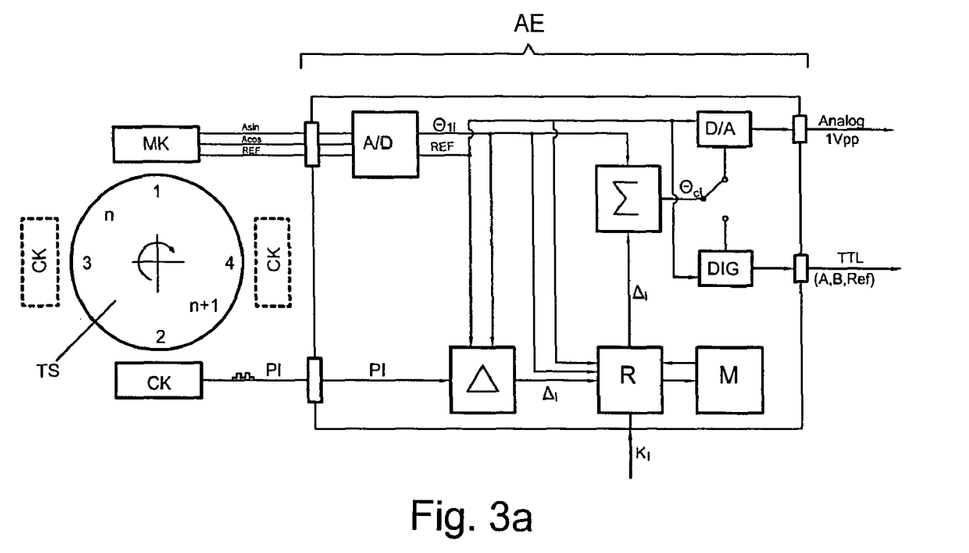
FIG. 3a shows an inventive position-measuring device with an electronic evaluation unit in detail during the calibration procedure.
Figure 3B:
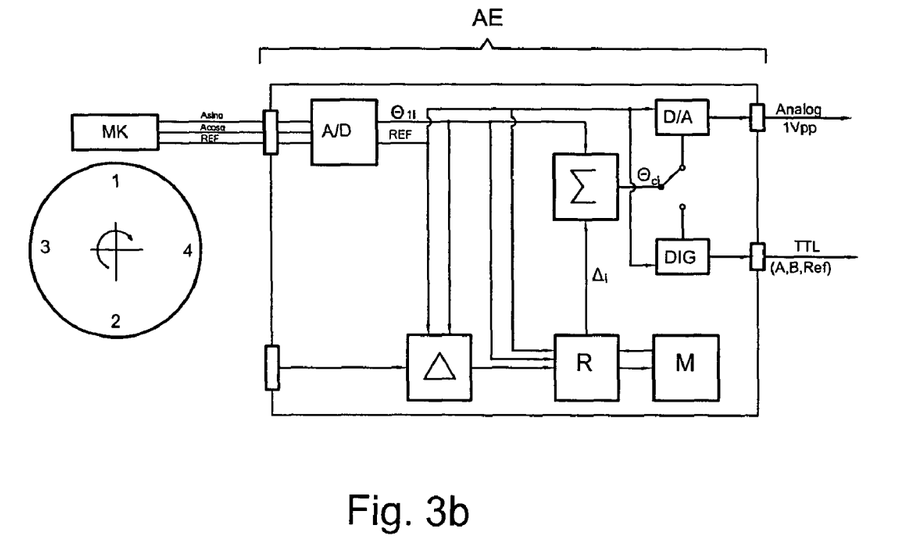
FIG. 3b shows an inventive position-measuring device with an electronic evaluation unit in detail after the calibration procedure.

FIGS. 3a and 3b show detailed block diagrams of the way in which the signals are processed in an inventive position-measuring device such as that shown in FIGS. 2a and 2b during the calibration procedure and during normal operation. The evaluation unit AE has three inputs, one for the measurement head MK, one for the calibration head CK, and one for the configuration determination $K_i$.

The measurement head has a complete electronic detection system and delivers, for each angle, a complete set of incremental angle data—in the present case it is assumed that the data consist of periodic signals pairs representing the sine and cosine and also a reference position signal, which is absolute with respect to the measurement standard and which is also referred to below as "REF", this being done once per revolution.

Figure 4A:
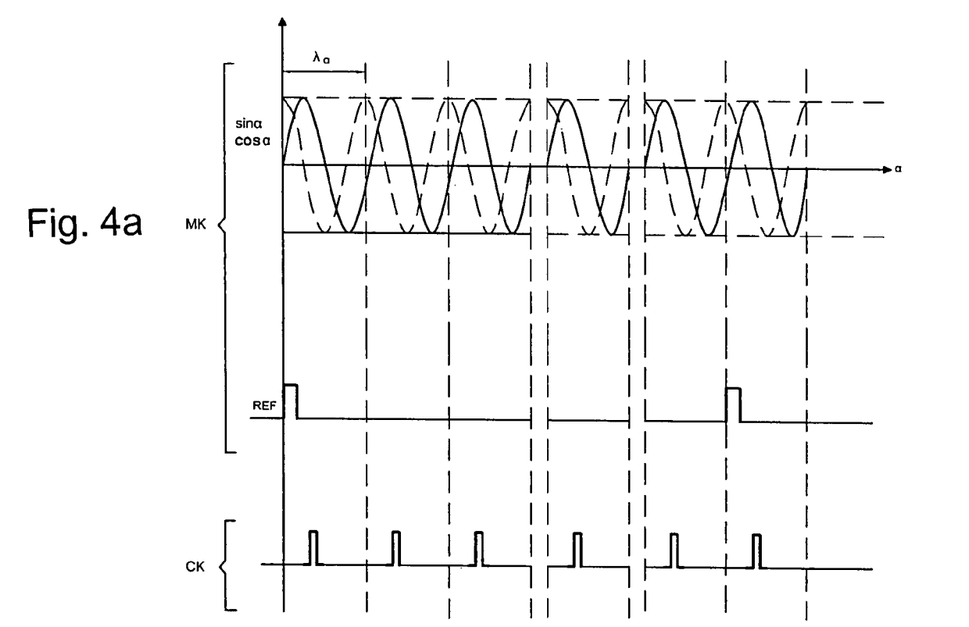
FIG. 4a and FIG. 4b are graphs of the measurement data recorded and converted by the measurement head and the calibration head.
Figure 4B:
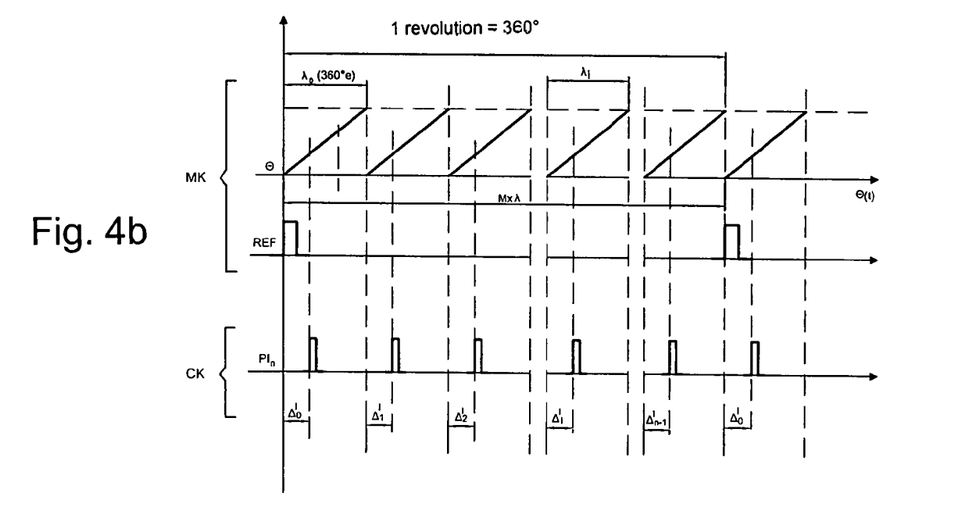

The calibration head CK with a simplified electronic circuit delivers only a single short signal P1 per period of the measurement standard; in the present case, it does this when the electrical angle "α" within a period assumes a value of zero (FIG. 3a and FIG. 4).

During the first phase of the calibration procedure, the calibration head CK is mounted diametrically opposite the measurement head MK in position "2" for scanning the scale division disk; it is connected to the AE; and the configuration switch $K_i$ is set to position "2".

During the relative rotation of the scale division disk, the calibration procedure begins when the reference marking on the disk triggers the reference signal REF in the measurement head MK. The analog measurement signals from the measurement head MK are converted within each measurement period into an absolute electrical angle value "θ" according to an arbitrary evaluation method (such as arc-tangent, tracking). These angle values "θ" are sent to a difference block Δ for the detection of the relative angle deviations versus the calibration head CK, and they are also sent to the summation block Σ, where the calculated absolute angle corrections are applied to the associated current "$θ_i$" angle. The corrected angle value "$θ_c$" is sent onward either to a sine/cosine digital-analog converter for the analog output interface or to a code conversion block for the rectangle TTL known encoder format output (A, B, Ref).

Under these conditions and under the assumption that the two scanning heads are mounted precisely diametrically and in phase, we obtain the following for the first period after the reference pulse:

$θ_{10} = θ_0 + e_0 + ε_{10}$ $θ_{20} = θ_0 - e_0 + ε_{20}$ $Δ'_0 = θ_{10} - θ_{20} = 2e_0 + ε_{10} - ε_{20}$ $Θ_{co} = θ_{10} - (Δ'_0)/2 = θ_0 + (ε_{10} + ε_{20})/2$ where:
$θ_{ji}$ j=position of the measurement head (1, 2, 3, or 4 in FIG. 3),
  i=order of the period
$θ_{ci}$ starting angle
$e_i$ eccentricity in the measurement head axis
$ε_{ji}$ sum of the systematic errors
$θ_i$ ideal angle,
For each additional period we obtain in general:

$θ_{1i} = θ_i + e_i + ε_{1i}$ $θ_{2i} = θ_i - e_i + ε_{2i}$ $Δ'_i = θ_{1i} - θ_{2i} = 2e_i + ε_{1i} - ε_{2i}$ $θ_{ci} = θ_i + (ε_{10} + ε_{20})/2$

It is apparent that the corrected starting angle $θ_{ci}$ is no longer affected by the eccentricity "e" of the scale division disk and that all other systematic errors, the signs of which are of no importance in the sum, are reduced to a mean value.

To achieve an even higher degree of accuracy, the calibration procedure can be extrapolated diametrically in pairs such as in the additional positions "3" and "4" shown in FIGS. 2 and 3. It can be repeated even more times than this, there being no theoretical limit, in any number of additional offset positions, until the accuracy deviation is reduced in practice to the low level of mere background noise, which remains uniform over the course of a revolution.

During the calibration procedure, correction values $Δ'_i$ assigned to all of the periods are stored in a nonvolatile memory M of the electronic evaluation unit AE, shown in FIG. 3:

The assignment of the individual correction values to the associated calibration head positions and reference angles is accomplished by the control unit R (FIG. 3) on the basis of the data $K_i$, supplied externally, concerning the calibration positions in question.

Only one measurement head is required for the further operation of the angle-measuring system shown in FIGS. 2c and 3b. The angle data being made available as output have already been corrected, just as if they had been generated in the presence of several scanning heads providing measurement data for error correction.

Because several scanning units are used during the calibration procedure and because only a single one remains active during operation, the problem of the phase variation between the individual scanning units does not occur in the first place.

The phase difference which can occur when several scanning units are in use can be caused by shaking, by incorrect "pointwise" determination of position, or by dirt on the scale division, and it is the primary problem of a measuring device according to the prior art with multiple scanning units.

For the sake of simplicity, only one measuring device with periodic incremental scale division of the measurement standard has been presented so far. The inventive measuring system is obviously just as suitable for measuring devices which work on the basis of a determination of absolute position. Here the difference between two measurement values of the scanning heads, i.e., the measurement head and the calibration head, which have been mounted diametrically opposite each other with respect to the scale division, is detected, there being no need for a reference signal REF.

The variation of this difference, relative to the angular position versus the measurement standard, is a measure of the systematic error of the measuring device and can, if stored, be used afterwards during operation, as previously explained, to provide angle correction data as output. During the following operating phase, a single measurement head is sufficient, because the correction of the measurement values for the detected angles is carried out exclusively with the use of the stored correction data.

A combination of incremental and absolute position detection can also be realized in accordance with the principle described above.

The inventive calibration procedure can also be used, for example, for the calibration of an axis of rotation for accurate computer-controlled systems, also called CNC (Computerized Numerical Control) systems.

Figure 5:
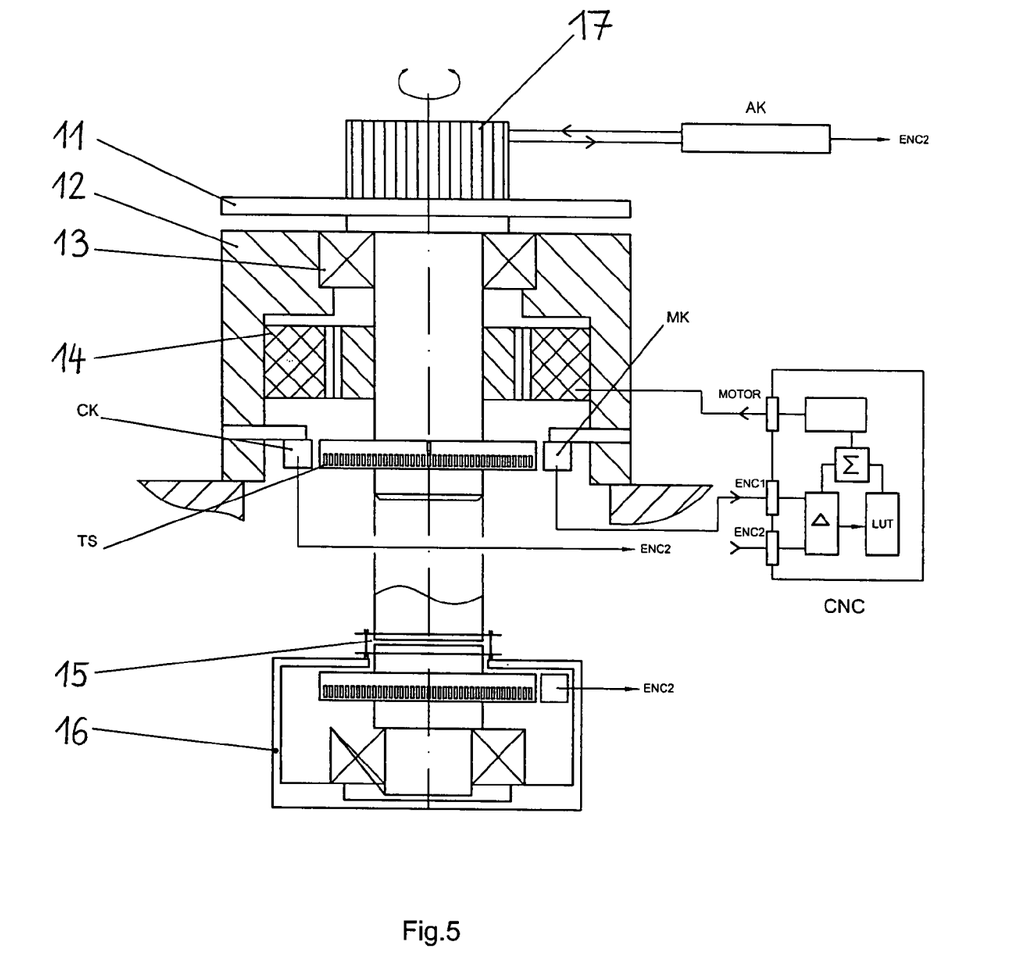
FIG. 5 shows a rotating worktable of a machine tool with a position-measuring device.

A rotary worktable of a CNC machine tool as shown in FIG. 5 can be taken as an example, where 11 designates a rotating plate, 12 the worktable body, 13 the bearing, and 14 the motor.

The angular position of the table is determined in closed control loops by the CNC machine, and the motor position is determined as feedback data from the angle-measuring device.

The angle-measuring device consists of a scale division disk TS, which is connected to the rotating part, and a measurement head MK, which is mounted on the stator part and is connected to a controller by way of a so-called encoder input ENC1.

For high-precision applications, it is generally known according to the prior art that, to compensate for the systematic errors of the axis of rotation such as the runout of the bearing, the eccentricity of the scale division disk, local scale division errors, etc., a second angle-measuring device complete in itself can be attached redundantly to the first to calibrate the system after the complete system has been installed.

The measurement data from the two angle-measuring devices are compared with each other, and the deviations are determined and stored as correction data for subsequent operation of the CNC machine. After this procedure, the second angle-measuring device is removed.

A laser autocollimator AK with a measuring polygon 17 (FIG. 4) or a second angle-measuring device 16, clamped by a coupling 15 to the axis of rotation, can be used as a "reference device" of this type. The angle data generated as output can be sent either directly via second encoder input ENC2 to the CNC system, so that the corrections can be obtained automatically by way of suitable computer algorithms and then stored, or, for example, they can be read from a position display unit and then entered manually as error compensation data into the CNC system.

This calibration procedure, however, is very complicated, and the correction values thus obtained are influenced by deviations in the installation of the reference measuring system or, as is well known, by the transmission error of the coupling used. According to the inventive calibration method described above, it would be sufficient to mount a second calibration head CK (FIG. 4) in this measuring arrangement only temporarily to scan the same scale division disk TS at a diametrically opposite point. Generally formulated, this means that, in the invention, only one additional, temporarily mounted scanning head is necessary, but it scans the same measurement standard as the measurement head, where the measurement head and the measurement standard remain installed at all times and provide the measurement values during operation.

The angle data of this calibration head can be sent to the input ENC2 of the CNC system, where a calibration of the axis is carried out by processing of the signals in a manner equivalent to that used in the previously described electronic evaluation unit AE.

For an even better degree of error suppression in this measuring arrangement, the calibration head can again be located in additional diametrically opposing positions to provide data for evaluation.

Upon completion of the calibration procedure, the calibration head can be removed, because the correction values have already been stored in the CNC system, where they remain available for use during the further operation of the axis.

In the following, a description is presented of how an inventive position determination method can be used not only to determine angles but also to determine distances in linear measurement systems. A linear axis of a system, e.g., of a tool, of a high-precision measuring device, etc., can therefore be designed in the inventive manner and calibrated in a similar manner. So that errors can be suppressed, advantage is again taken of the fact that the measurement errors are essentially based on systematic and reproducible sources of error, which include geometric local machine errors or local scale division errors of the measurement standard, deviations caused by impacts, vibrations, etc.

Figure 6:
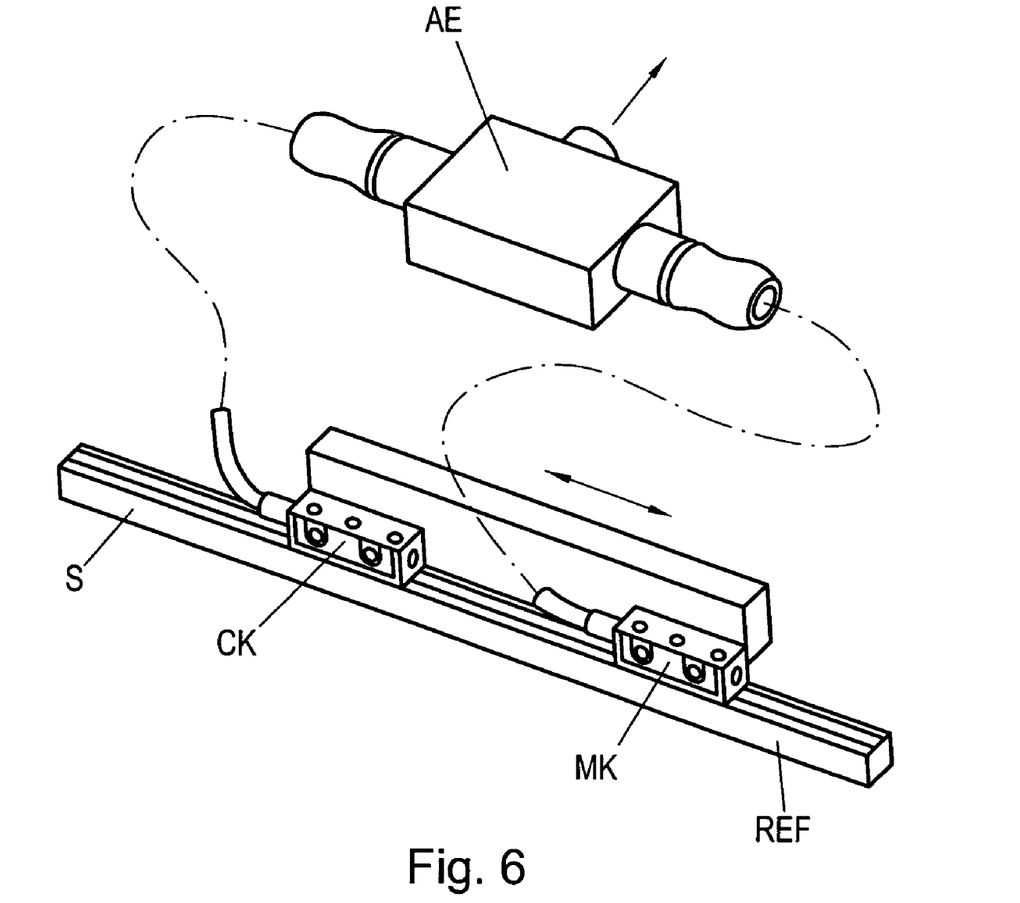
FIG. 6 shows an application of an inventive position-measuring device for the detection of linear distances.

A linear application of this type is illustrated in FIG. 6. In this case, a calibration head CK is used in addition to the measurement head MK during the calibration procedure. This additional head is also attached to the machine slide. The measurement head and the calibration head are connected to the same body and do not change their relative positions during the calibration procedure. Both of them read the same measurement standard but at different positions.

After the entire measurement length has been measured out, the differences in the positions or distances which have been measured by the two scanning heads are determined and stored in the form of correction values. During operation after removal of the calibration head CK, each position value supplied by the measurement head MK is corrected by the previously detected correction values or deviations. The calibration head CK can be used elsewhere for the calibration of other linear axes.

While specific embodiments of the invention have been described in detail to illustrate the inventive principles, it will be understood that the invention may be embodied otherwise without departing from such principles.

I claim:

1. A position-measuring device for detecting the relative position of two bodies capable of motion relative to each other, the device comprising a measurement standard with a scale division connected to one of the bodies and a scanning head connected to the other body for reading the scale division, wherein the scanning head is connected to an electronic evaluation unit having a nonvolatile memory, correction values for the nonvolatile memory being configured for storing measurement values recorded by the scanning head, wherein the correction values are determined during a calibration of the position-measuring device from the measurement values of the scanning head and from the measurement values of at least one additional, temporarily mounted scanning head, which scans the same measurement standard.

2. A method for detecting the relative position of two bodies capable of motion relative to each other, the method comprising scanning a measurement standard connected to one of the bodies by a scanning head connected to the other body, correcting the measurement values recorded by the scanning head by stored correction values which are determined during a preceding calibration from the measurement values of the scanning head and from the measurement values of at least one additional, temporarily mounted scanning head, which scans the same measurement standard.

3. A method for calibrating a position-measuring device for detecting the relative position of two bodies capable of movement relative to each other, wherein the position-measuring device comprises a measurement standard with a scale division connected to one of the bodies and a scanning head connected to the other body to scan the scale division, the scanning head being connected to an electronic evaluation unit, the method comprising adding at least one additional scanning head to the position-measuring device to scan the same measurement standard; determining measurement values by the scanning heads; determining correction values from the deviations between the measurement values recorded by the individual scanning heads storing the correction values in a nonvolatile memory of the electronic evaluation unit; and subsequently removing the additional scanning head from the position-measuring device.

* * * * *